(12) United States Patent
Tulip

(10) Patent No.: US 6,704,333 B2
(45) Date of Patent: Mar. 9, 2004

(54) LARGE AREA LASER

(76) Inventor: John Tulip, 11625 Edinboro Road, Edmonton, Alberta (CA), T6G 1Z7

(*) Notice: Subject to any disclaimer, the term of this patent is extended or adjusted under 35 U.S.C. 154(b) by 0 days.

(21) Appl. No.: 10/001,925

(22) Filed: Dec. 5, 2001

(65) Prior Publication Data

US 2004/0013150 A1 Jan. 22, 2004

Related U.S. Application Data

(60) Provisional application No. 60/251,520, filed on Dec. 7, 2000.

(51) Int. Cl.⁷ .................................................. H01S 3/13
(52) U.S. Cl. ................. 372/29.013; 372/29.01; 372/29.02; 372/29.022
(58) Field of Search ............. 372/29.01, 29.013, 372/29.02, 29.022, 87

(56) References Cited

U.S. PATENT DOCUMENTS

| | | | |
|---|---|---|---|
| 4,352,188 A | * 9/1982 | Griffith | 372/82 |
| 4,363,126 A | * 12/1982 | Chenausky et al. | 372/38 |
| 4,443,877 A | 4/1984 | Chenausky et al. | 372/38 |
| 4,601,039 A | 7/1986 | Sze | 372/83 |
| 4,719,639 A | 1/1988 | Tulip | 372/66 |
| 4,939,738 A | 7/1990 | Opower | 372/95 |
| 5,079,773 A | * 1/1992 | Hart et al. | 372/18 |
| 5,610,936 A | * 3/1997 | Cantoni | 372/93 |

FOREIGN PATENT DOCUMENTS

| | | | |
|---|---|---|---|
| EP | 0355758 | 5/1990 | H01S/3/03 |
| JP | 01069084 | 3/1989 | H01S/3/097 |
| WO | WO 95/05060 | 2/1995 | H05H/1/46 |

OTHER PUBLICATIONS

Bethel, J.W., H.J. Baker, D.R. Hall. "A new scalable annular CO2 laser with high specific output power." *Optics Communications 125* (1998) pp. 352–358. Dept. of Physics, Heriot–Watt University, Edinburgh, UK.

European Search Report for patent application No. EP 01 12 9143. Oct. 17, 2002. 2 pages.

* cited by examiner

*Primary Examiner*—Paul Ip
*Assistant Examiner*—Leith A Al-Nazer

(57) ABSTRACT

A large area slab laser, wherein disharge is confined between two large area electrodes. A two dimensional array of inductors is placed across the electrodes so that the standing wave patterns associated with the propagation of the high frequency driving current are corrected. In one embodiment, the electrodes are planar, in another, the electrodes are annular.

16 Claims, 6 Drawing Sheets

LARGE AREA LASER

CROSS-REFERENCE TO RELATED APPLICCATIONS

This application claims the priority of provisional application Ser. No. 60/251,520 filed Dec. 7, 2000.

BACKGROUND OF THE INVENTION

Prior to the slab gas laser, diffusion cooled gas discharge lasers were characterized by output power per unit length of discharge and were typically limited to a maximum output power of 100 watts. The invention of the slab gas laser meant for the first time that the output power from diffusion cooled lasers could be scaled by discharge area rather than length only and could be characterized by a new figure of merit, watts output power per unit area of discharge. CO2 slab lasers of over three kilowatts are currently available commercially.

In order to maximize discharge cooling, the planar discharge of the slab CO2 laser is only typically one to two millimeters and the discharge electrodes are used as an optical waveguide. In order to stabilize the thin gas discharge and to maximize laser output power, the slab laser is driven at high frequency, which is typically 100 MHz. With this discharge driving frequency the electrical wavelength is typically comparable to the dimensions of the laser structure. Standing waves of current and voltage occur across the discharge electrodes and the resulting discharge non-uniformity causes serious degradation of laser power unless corrective measures are taken.

A method of reducing discharge non-uniformity resulting from electrical standing waves, well known in the art, is a linear array of inductors connecting the discharge electrodes along the length of the discharge. This inductor array is placed on one or both sides of the electrode. This method is limited because it is linear and eliminates the standing wave only along the length of the electrodes. State of the art slab lasers are typically long and narrow so that this linear discharge method has been adequate. Attempts to scale slab lasers to very high power to meet the requirements of modern material processing machinery has resulted in the commercialization of slab lasers of large discharge area. Maximum output power of state of the art slab lasers is however limited by the area of discharge that is currently practicable. The length of the electrodes is limited by mechanical and thermal distortion of the waveguide to about 100 cm and the width is limited by standing wave induced discharge non-uniformity to about 20 cm.

In the art, large area annular waveguide lasers have been disclosed as an alternative to planar slab lasers. A cylindrical structure is intrinsically more mechanically stable than a planar structure and a large area of discharge may be contained in a physically smaller structure than in a slab. However the annular laser has not emerged as an alternative technology to the Slab laser because of practical difficulties. The formation of standing electrical standing wave along the length and around the circumference, the structural difficulties of driving and cooling coaxial cylindrical electrodes and the difficulties associated with obtaining a coherent laser beam from an annular waveguide has thus far prevented the practical use of annular waveguide gas lasers.

SUMMARY OF THE INVENTION

A new method of electrical excitation of a slab discharge is disclosed. A two dimensional array of inductors is used to eliminate standing wave field patterns along the length and across the width of the electrodes. This method may be used to generate uniform gas discharge intensity for electrodes of arbitrary length, width and shape. The application of this new discharge balancing technique permits larger electrode area electrodes than is possible with prior art slab lasers and hence higher power.

Therefore, according to an aspect of the invention there is disclosed a laser, comprising first and second electrodes disposed adjacent each other to form a gap between them, each of the first and second electrodes extending laterally; a laser gas disposed within the gap; means to provide electrical excitation to the first and second electrodes and generate a laser discharge within the gap; mirrors defining a resonator disposed at opposed ends of the gap; and an inductor array disposed across and along at least one of the first electrode and the second electrode to reduce lateral discharge non-uniformities. The inductor array is connected to the electrode and to a ground or reference plane.

According to further embodiments of the invention, the laser is a gas slab laser with planar and preferably parallel electrodes. The resonator is preferably an unstable resonator. The inductor array is preferably connected to an external conductor acting as the ground or reference plane. In a still further embodiment, the electrodes are cylindrical and have an annular discharge gap between them. In operation, the inductors cause a distributed parallel plate resonance between the electrodes, resulting in voltage variation across the width and length of the electrodes being less than 5%.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, "comprising" means "including". In addition, a reference to an element by the indefinite article "a" does not exclude the possibility that more than one of the element is present.

Figure 1:
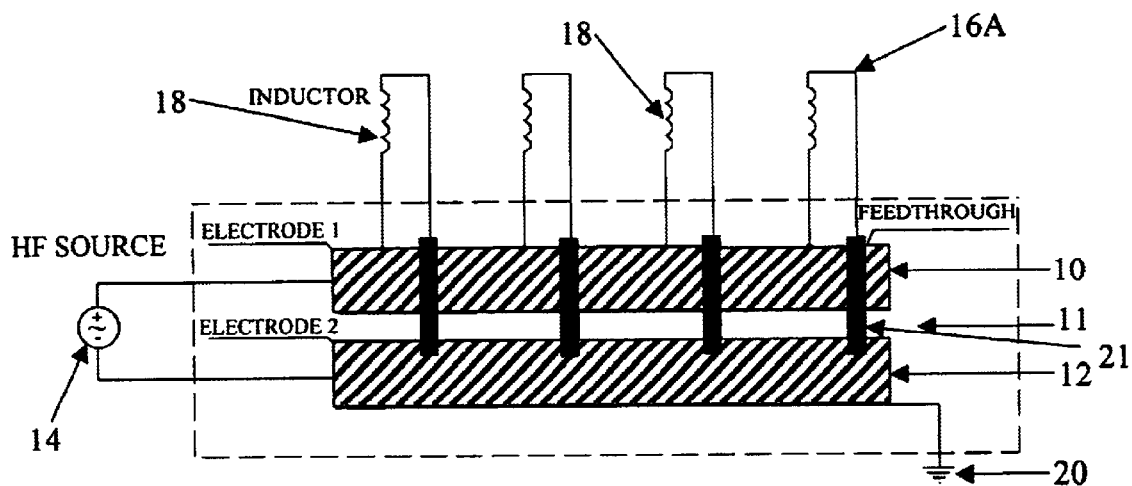
FIG. 1 is a side section schematic illustrating an embodiment of the invention with planar electrodes.
Figure 2:
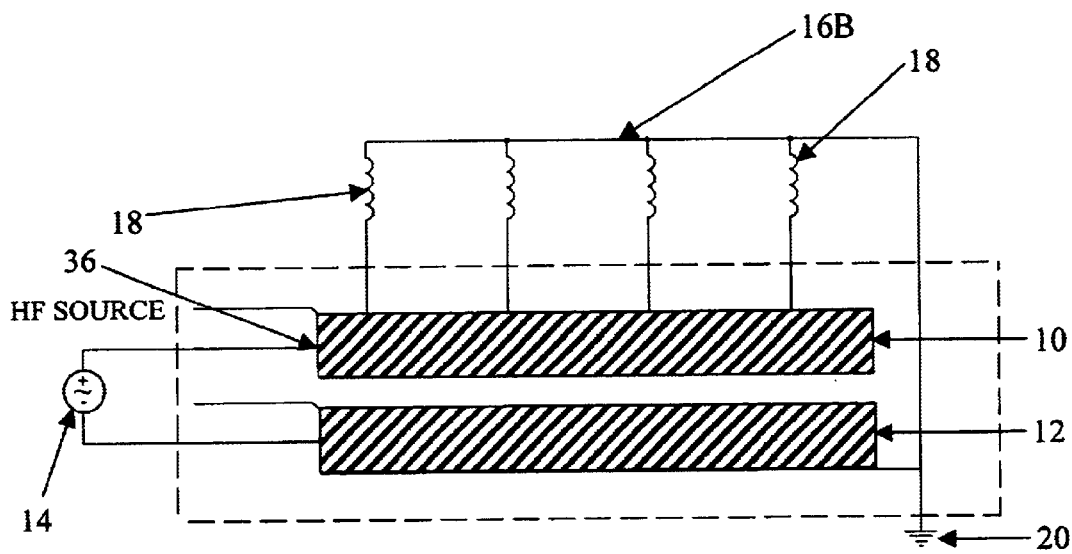
FIG. 2 is a side section schematic illustrating a second embodiment of the invention.
Figure 3:
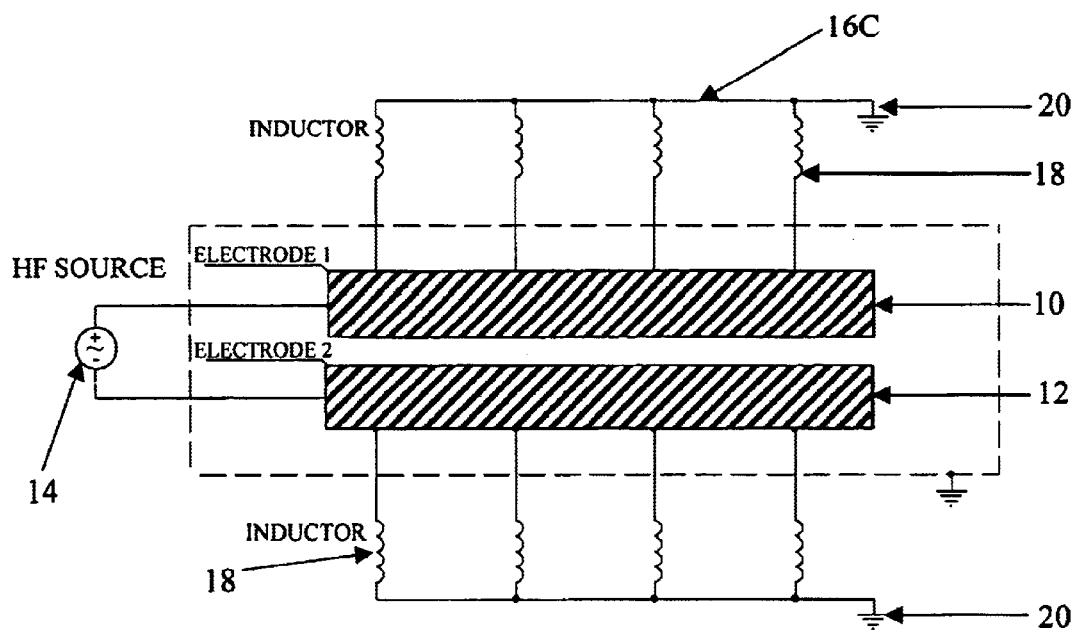
FIG. 3 is a side section schematic illustrating a third embodiment of the invention.
Figure 4:
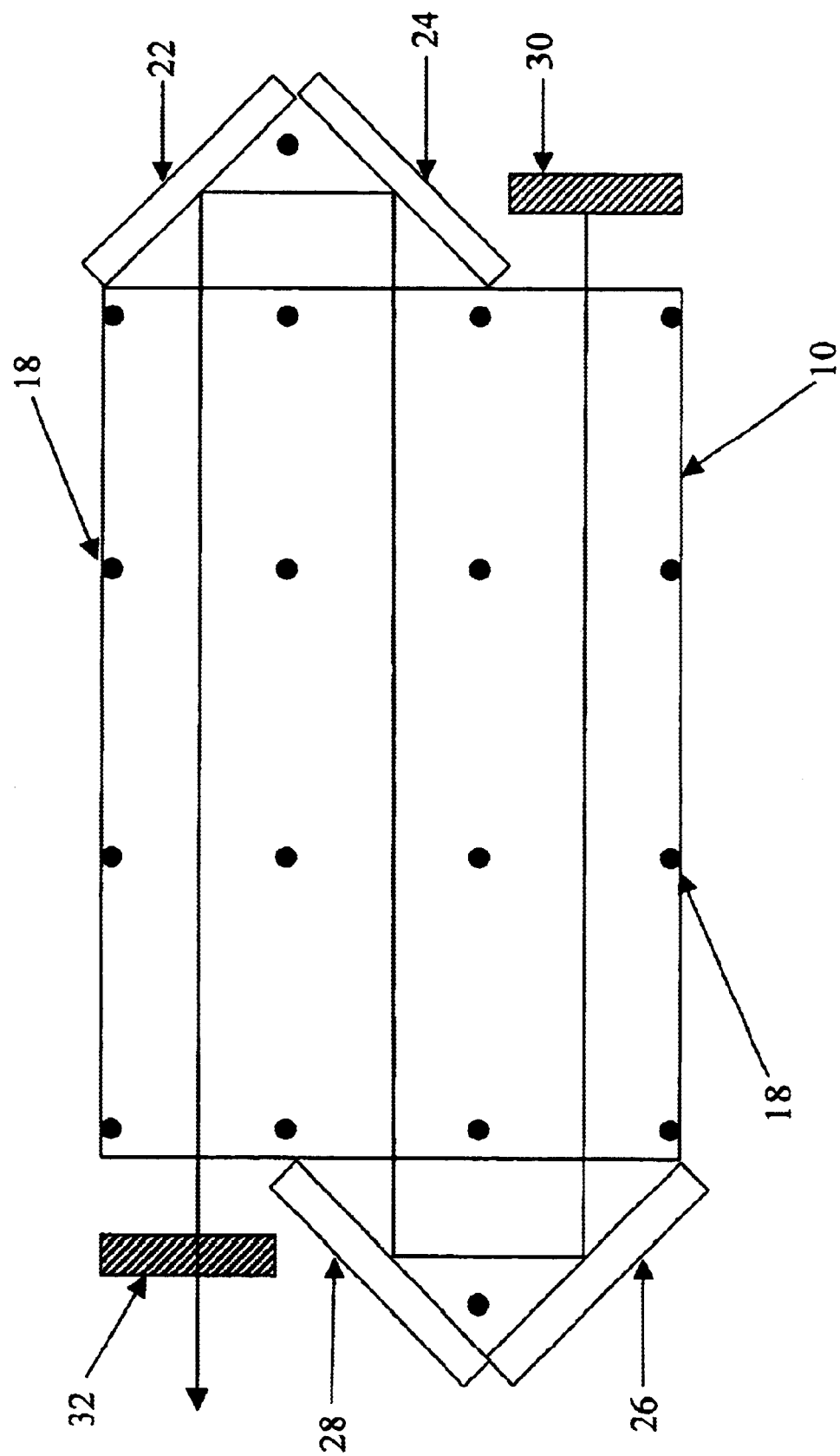
FIG. 4 is a plan view of an embodiment of the invention illustrating a light path through an embodiment of the invention.

The embodiments of the invention shown in FIGS. 1, 2 and 3 each include a first electrode 10 and a second electrode 12 to which are connected in conventional fashion a high frequency excitation source 14 with a gap 11 between them. A common feature of these various embodiments is a two dimensional array 16A, 16B and 16C of inductors 18 connected to the high voltage electrode 10. The array extends across and along the electrode 10, with inductors 18 connected to the interior of the electrode 10 between lateral edges of the electrodes 10, 12. The inductors 18 connected to the high voltage electrode 10 are also connected to a ground or reference plane 20, which may be a continuous sheet or grid of conductors. In the embodiment shown in FIG. 1 the inductors 18 are connected by feedthroughs 21 to the ground plane electrode 12. Unlike prior art lasers, in which inductors are linearly arranged along an electrode, the inductor array 16A extends across the electrode width as well as the electrode length. FIG. 4 illustrates the distribution of the balancing inductors 18 with respect to the laser optics.

A disadvantage of this embodiment is that the connections 21 of the inductor array 16A to the ground electrode 12 presents an optical obstruction to the laser resonator. It is hence necessary in this embodiment to segment the resonator into parallel paths divided by the line of inductor connections. Possible resonators include an oscillator in one optical segment followed by amplifying stages in the remaining segments.

Another possible resonator, which is illustrated in FIG. 4, is a folded unstable resonator in which folding mirrors 22, 24, 26 and 28 are placed at opposite ends of the electrodes 10, 12. The folding mirrors 22, 24, 26 and 28 create multiple paths between the line of inductors 18 for the light to pass through the gap 11 between the electrodes 10, 12. The light reflects between the resonator mirrors 30 and 32 until the light discharges in conventional fashion at the output resonator mirror 32.

An advantage of the embodiment shown in FIG. 1 is that the inductor connections 21 to the grounded electrode 12 are insulated, typically with a ceramic insulator able to withstand the adjacent gas discharge. This insulator may also act as a support for the electrodes 10, 12 so that the problem of mechanical sagging that may occur in wide electrodes may be avoided.

FIG. 2 shows an alternative embodiment of the invention where the discharge balancing inductors 18 are not connected to the ground electrode 12 but are connected to another ground plane 20 disposed on other side of the ground electrode 12 from the high voltage electrode 10. This embodiment avoids the obstruction of the optical path by inductor connections such as feedthroughs 21. A disadvantage of this embodiment is that no supporting structures are positioned between the sides of the electrode so that in a wide structure where sagging may occur, strengthening structures will be required to maintain the electrode discharge gap uniformity across the electrode width.

The embodiments shown in FIGS. 1 and 2 are referred to in the high frequency electrical art as unbalanced structures. One electrode is held at high voltage and the other is held at a reference or ground voltage. FIG. 3 shows another embodiment of this invention, which is referred to in the electrical art as balanced. In this embodiment both electrodes 10, 12 are held at high voltage and both are connected to adjacent ground planes 20 by inductor arrays 16C. This embodiment shares the same advantages and disadvantages as the embodiment of FIG. 2.

The disclosed inductor array does not share the limitations disclosed in prior art linear inductor arrays. The inductors 18 are of equal value and may be placed close to the electrode edges without causing non-uniformity of the discharge. The inductors are preferably disposed in an equidistant uniform pattern as illustrated in FIG. 4. The shape of the electrodes 10, 12 may be rectangular but they also may be irregular as may be required for folded optical resonators. The total inductance of the inductor arrays 16A, 16B, 16C and the total electrode capacitance preferably resonates close to the driving electrical frequency of the excitation source 14. This is not necessary for the generation of a uniform discharge but is desirable because the net reactance seen by the driving electrical circuit is minimized when the resonant condition is achieved. The inductor array disclosed in this invention behaves in a similar manner consistent with distributed parallel plate resonance.

Figure 5:
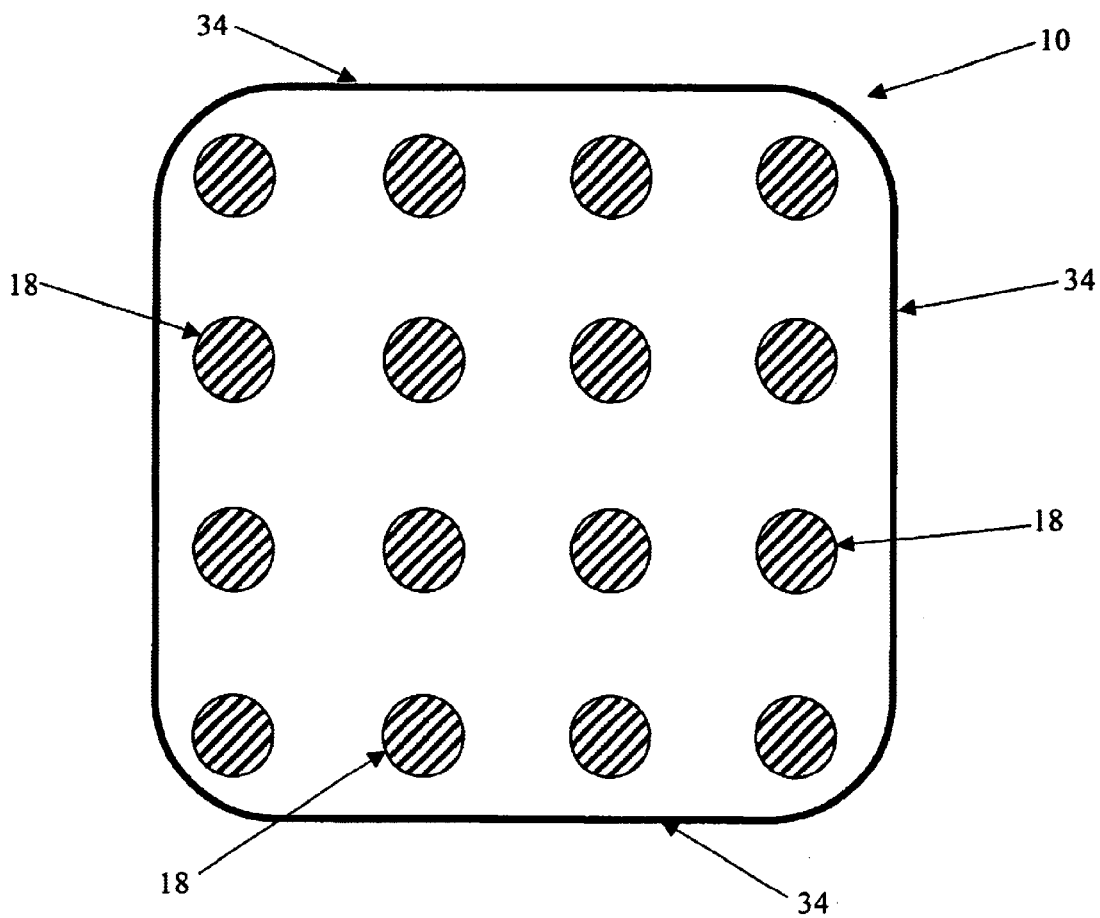
FIG. 5 is a section through an electrode showing distribution of inductors in an array across the interior of the electrode between the edges of the electrode.

In an embodiment of the large area laser shown in FIG. 2, the electrodes are 35 cm long and 35 cm wide and are spaced to from a gap of 3 mm. The relative position of 16 inductors 18 connected across and along the high voltage electrode 10 is shown in FIG. 5 with inductors connected to the interior of the electrode, that is, the portion of the electrodes between the lateral edges. The rectangular spacing of the inductors 18 is 11.5 cm and inductors are placed about one centimeter from the electrode lateral edges 34. The electrode capacitance and the total inductance of the parallel inductors 18 resonate at a frequency of about 70 MHz, the driving frequency. The ground plane 20 which is disposed next to the high voltage electrode 10 is connected to the ground electrode 12 with a low impedance copper strip on the side of the electrodes 10, 12 opposite the driving point 36 (FIG. 2). The distribution of voltage across the high voltage electrode 10 was measured using a high voltage high frequency voltmeter. The voltage was uniform at all point on the electrode 10 to within the 5% measurement error. This occurred despite the fact that as much as 10% variation in the inductance values of the inductors 18 was measured.

Figure 6:
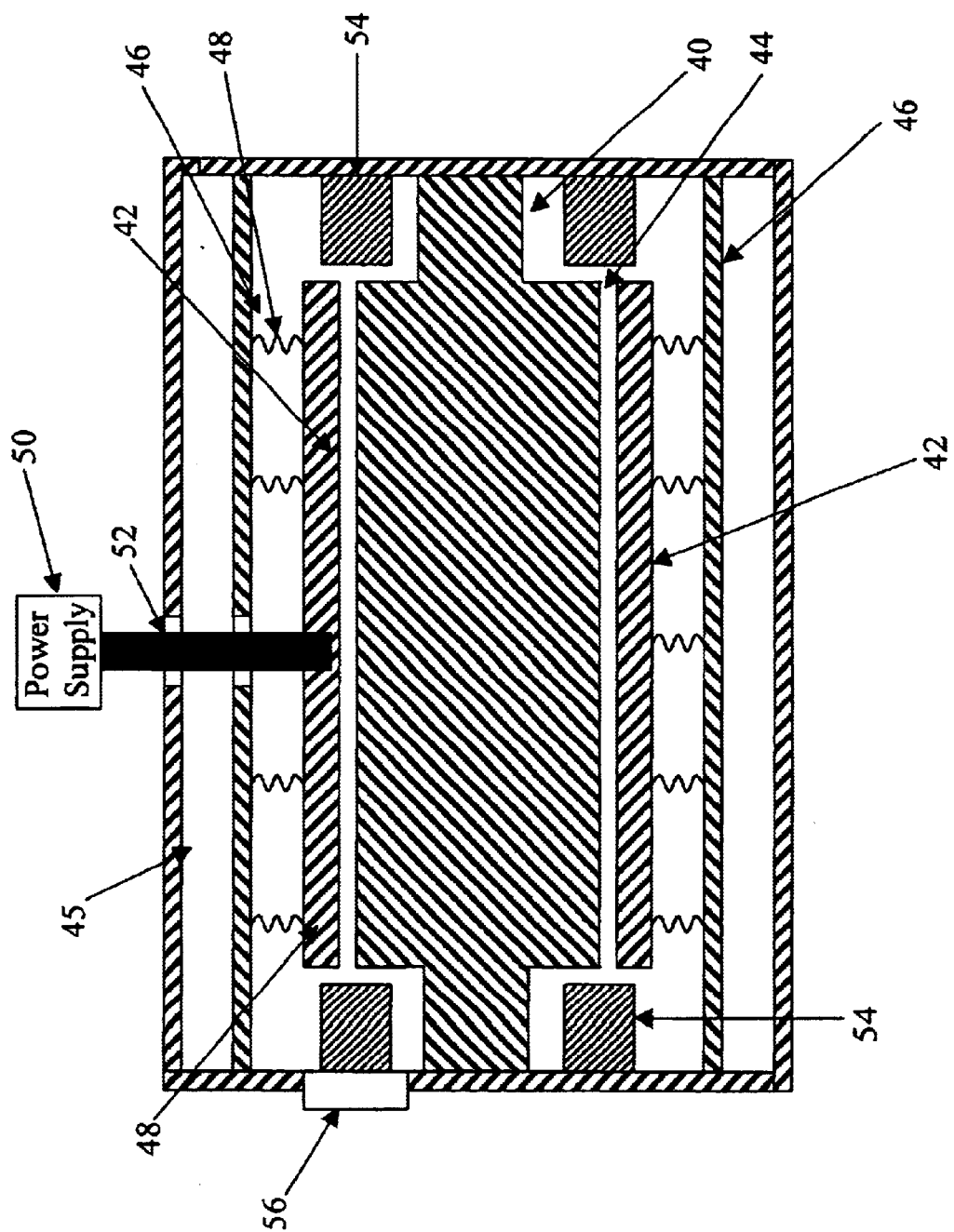
FIG. 6 is a cross-section through an annular laser according to the invention.
Figure 7:
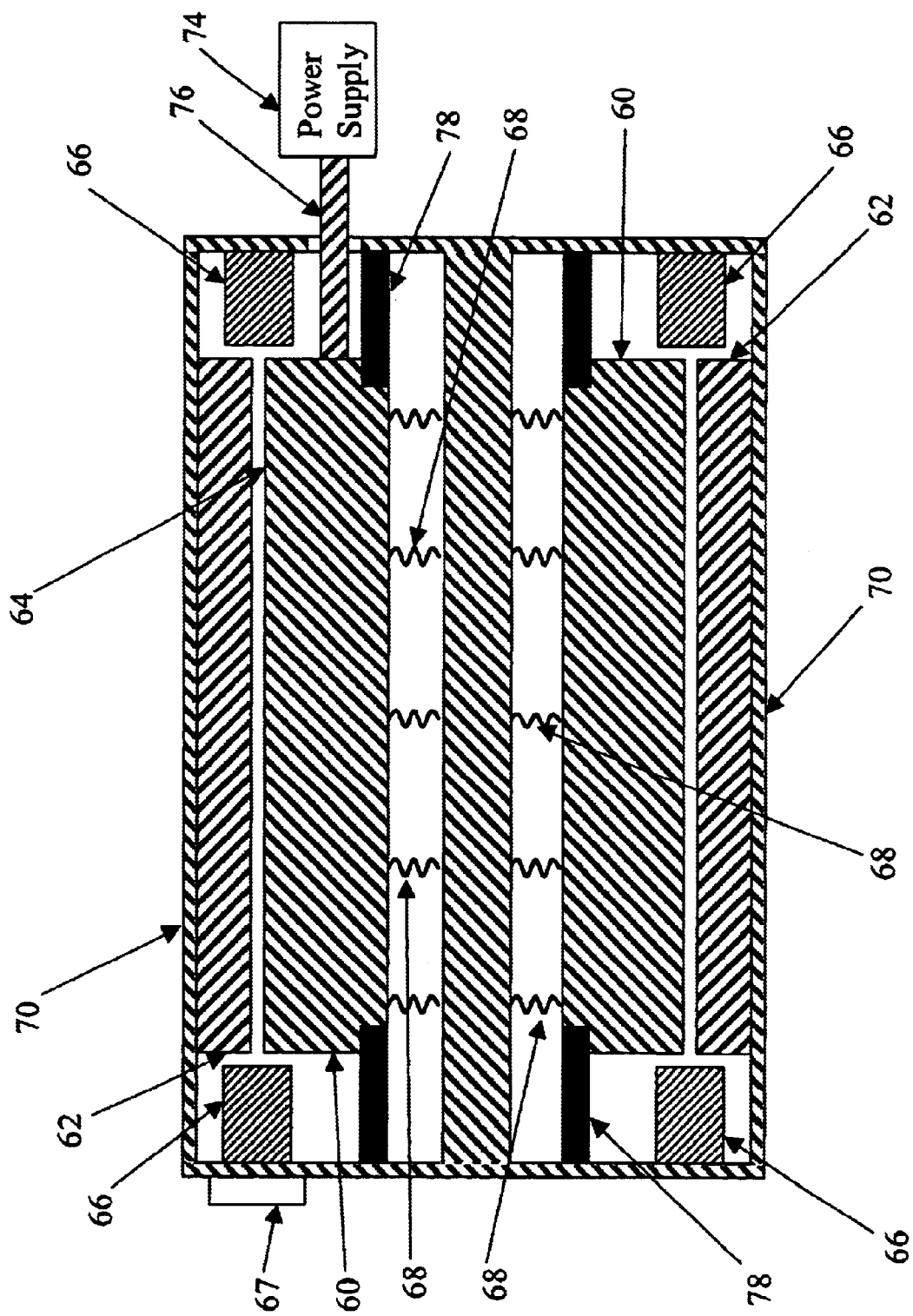
FIG. 7 is a cross-section through an annular laser showing inductors on the inner electrode of an annular laser.

In the embodiment shown in FIGS. 6 and 7, an inductor array is applied to a large area annular discharge laser. The disclosed structure is physically less complex than prior art annular discharge lasers and the diameter of the discharge, and hence the laser power, may be scaled to high values. Prior art annular lasers are constructed using two coaxial cylindrical electrodes and the laser gas discharge is formed in an annular gap between the inner and outer cylindrical electrodes. Larger diameter annular prior art lasers require an outer electrode, which is split in order to achieve a uniform discharge around the circumference. FIG. 6 shows a schematic of an embodiment of this invention. This annular laser has a triaxial construction and is made up of an inner cylindrical electrode 40 and an outer cylindrical electrode 42 and the laser discharge is formed in an annular gap 44 between these electrodes in a similar manner to prior art annular laser. The outer discharge electrode is connected to the laser enclosure 45 and held at ground.

Unlike prior art annular lasers, a third cylindrical conductor 46, which surrounds the outer electrode 42, is used in the discharge excitation process. This cylindrical conductor is connected to the outer electrode 42 by an array of inductors 48 and is also connected to ground by a low impedance connection. The outer discharge electrode 42 is insulated from the laser structure and is connected to the high voltage driving electronics 50 by an insulated electrical feed-through 52. Cooling fluid, such as distilled water, is passed through both electrodes using insulating liquid flow tubes, which are not shown but are conventional for annular lasers. The three conductor coaxial assembly is mounted in a vacuum enclosure 45, which is used to enclose the electrodes 40, 42 in low pressure laser gases. This enclosure 45 may also be cylindrical but not necessarily. The inductors 48 are arrayed across (that is, around) the electrode 42 and along the length of the electrode 42 to form a two dimensional array with a typical spacing of 10 cm. Annular laser resonator mirrors 54 are mounted proximal and adjacent to both ends of the annular discharge 44 in conventional fashion. The mirrors 54 may be suspended from adjustment mechanisms mounted either on the ends of the laser enclosure 45 or on a thermo-mechanically stable resonator frame within the laser enclosure 45. This frame, the resonator mirrors 54 and the vacuum enclosure 45 are held at ground potential. Laser light outputs the laser enclosure 45 through an output window 56 in conventional fashion.

A cylindrical electrode construction is electrically different from the large area planar slab laser. Electrical waves reflect from the edges of the electrodes 10, 12 of the slab laser and the reflected waves form complex standing waves, which are dependent upon the electrode shape. Unlike the slab laser, electrical waves will propagate unimpeded around the circumference of a cylindrical electrode and counter propagating waves form a standing wave and a non uniform discharge driving voltage. It is for this reason that prior art annular lasers with large diameter electrodes have split outer electrodes. In the disclosed annular laser, an array of inductors 48 disposed around the electrode perimeter and along the length of the electrodes is used to correct the standing waves. Notwithstanding that this annular structure is both mechanically and electrically very different from the large area planar slab laser an inductor array will reduce the electrical standing waves across the cylindrical electrode surfaces.

In one example of the embodiment shown in FIG. 6, an annular discharge structure had an inner cylindrical electrode diameter of 170 mm and an outer electrode diameter of 172 mm, which formed a discharge gap of 2 mm. The electrodes were precisely aligned to form a uniform discharge gap with variations of no more than +−0.1 mm. Inductors of equal value were disposed across the electrode surface in a square array of inductors 89 mm apart, resonated at 72 MHz. The inductance value of the inductors was adjusted to enable an impedance match between the discharge and the high frequency power source used to drive the discharge. The electrical voltage distribution across the electrode surface, without the inductors in place, varied by as much as 40% with a driving frequency of 100 MHz. With the inductor array in place the electrode voltage variation was reduced below the measurement accuracy of the instruments. The visible glow from the laser discharge, which is an established indicator of discharge uniformity, was constant within measurement accuracy around the circumference.

The inductors could be mounted inside an inner electrode 60 as shown in FIG. 7. An outer electrode 62 is concentrically mounted around the inner electrode 60 within vacuum enclosure 70 to form an annular discharge gap 64. The electrode 62 may be machined as part of the enclosure 70, and is grounded. The inner electrode 60 is supported within the enclosure 70 on electrical insulating mounts 78. Mirrors 66 disposed at either end of the discharge gap 64 form a resonator with an output window 67. Inductors 68 are distributed in an array across and along the inside of the inner electrode 60 and are connected to both the inner electrode 60 and a grounded conductor 72. The conductor 72 may also be formed as part of the vacuum enclosure 70. Inner electrode 60 is supplied with electrical energy from power supply 74 connected to the electrode 60 by electrical feed through 76. Such a design is less convenient. The inductors 68 cannot span the electrodes 60, 62 or they would block the beam. A central rod acting as a high voltage conductor 72 may be used if it were not too skinny and inductive. In this case the outer electrode 62 would be at ground, which is a desirable feature. The inner conductor 72 does not have to be a continuous plate.

Whatever electrodes are used for a large area slab laser, whether planar or annular, the laser is easier to build if the outer conductor, to which the inductors are connected, is a grid of conductors rather than a solid because it is then possible to measure the voltage across each inductor. The outer conductor for the annular laser and the large area slab with planar electrodes is a low impedance conductor connecting the electrodes through the inductor array. The preferred embodiment is one where the array of inductors does not span the gap and cause obstruction of the resonator. Just so long as the inductor array is balanced, typically to give equal inductance values, then the outer conductor could be any shape that is convenient as for example, square.

Large, in the sense of large area inductor array, means a laser whose transverse dimensions are sufficiently large, that lateral discharge non-uniformities are sufficient to have a noticeable effect on beam quality.

The electrodes 60, 62 may also have the form of segment of a cylinder, or follow any surface that is suitable for laser light propagation and that are large enough to form standing wave patterns, and are preferably parallel to each other.

This annular discharge method is useful for any discharge structure where the size of the structure is comparable in size with the electrical wavelength of the discharge power supply so is not limited to waveguide structures.

The laser gas may be that typically used in CO2 lasers, and may for example be a mixture of carbon dioxide, helium and nitrogen. The excitation frequency may be for example 10 MHz to 200 MHz and is chosen to generate a laser discharge within the laser gas.

While FIGS. 6 and 7 show sections in a plane that includes both the central axis and a diameter of the structure, it will be appreciated that a section perpendicular to the axis would show equally spaced inductors around one or both of the electrodes, as for example 89 mm apart in the example disclosed of the structure of FIG. 6.

Immaterial modifications may be made to the invention described here without departing from the essence of the invention.

I claim:

1. A laser, comprising:

first and second electrodes disposed adjacent each other to form a gap between them, each of the first and second electrodes extending laterally between a first lateral edge and a second lateral edge;

a laser gas disposed within the gap;

means to provide electrical excitation to the first and second electrodes and generate a laser discharge within the gap;

mirrors defining a resonator disposed at opposed ends of the gap; and a two-dimensional inductor array disposed across at least one of the first electrode and the second electrode to reduce lateral discharge non-uniformities, the two-dimensional inductor array comprising at least a first set of inductors closer to the first lateral edge than the second lateral edge, a second set of inductors closer to the second lateral edge than the first lateral edge and at least one interior inductor between the first set of inductors and the second set of inductors.

2. The laser of claim 1 in which the first and second electrodes are planar.

3. The laser of claim 2 in which the inductor array is connected to an external conductor.

4. The laser of claim 1 in which the first and second electrodes are parallel to each other.

5. The laser of claim 1 in which the resonator is an unstable resonator.

6. The laser of claim 1 in which the electrodes are cylindrical and have an annular discharge gap between them.

7. The laser of claim 1 in which the laser gas comprises carbon dioxide.

8. The laser of claim 1 in which the inductor array is connected between the first electrode and the second electrode.

9. The laser of claim 8 in which one of the first electrode and the second electrode is at a reference voltage.

10. The laser of claim 9 in which the reference voltage is ground.

11. A gas slab laser, comprising:

electrodes disposed to form a gap between the electrodes, the electrodes forming a light guide for light travelling through the gap and including a first electrode and a second electrode;

an electrical power source applied to the electrodes for creating a gas discharge in the gap;

a laser gas disposed in the gap;

an unstable resonator disposed about the electrodes for guiding light within the gap in combination with the electrodes; and a two-dimensional inductor array connected to the first electrode and to a ground or reference plane, the inductor array extending across the first electrode, the first electrode being disposed between the ground or reference plane and the second electrode, the inductor array including inductors connected between an interior part of the first electrode and the ground or reference plane.

12. The gas slab laser of claim 11 in which the laser gas comprises carbon dioxide.

13. A gas slab laser, comprising:

electrodes disposed to form a gap between the electrodes, the electrodes having an interior extending between lateral edges of the electrodes, the electrodes forming a light guide for light travelling through the gap;

an electrical power source applied to the electrodes for creating a gas discharge in the gap;

a laser gas disposed in the gap;

an unstable resonator disposed about the electrodes for guiding light within the gap in combination with the electrodes; and plural inductors connected in a two-dimensional array along the lateral edges of the electrodes and to the interior of the electrodes to reduce lateral discharge nonuniformity.

14. The gas slab laser of claim 13 in which, in operation, the inductors cause a distributed parallel plate resonance between the electrodes.

15. The gas slab laser of claim 13 in which, in operation, voltage variation across the width and length of the electrodes is less than 5%.

16. The gas slab laser of claim 13 in which the laser gas comprises carbon dioxide.

* * * * *